US010464143B2

(12) United States Patent
Liu et al.

(10) Patent No.: US 10,464,143 B2
(45) Date of Patent: Nov. 5, 2019

(54) WHEEL CAP SECTION CHAMFERING DEVICE

(71) Applicant: CITIC Dicastal CO., LTD, Qinhuangdao (CN)

(72) Inventors: Huiying Liu, Qinhuangdao (CN); Yuexin Lu, Qinhuangdao (CN); Guorui Wu, Qinhuangdao (CN); Shiqi Zhang, Qinhuangdao (CN)

(73) Assignee: CITIC DICASTAL CO., LTD, Qinhuangdao, Hebei (CN)

( * ) Notice: Subject to any disclaimer, the term of this patent is extended or adjusted under 35 U.S.C. 154(b) by 43 days.

(21) Appl. No.: 15/802,896

(22) Filed: Nov. 3, 2017

(65) Prior Publication Data

US 2019/0022772 A1 Jan. 24, 2019

(30) Foreign Application Priority Data

Jul. 21, 2017 (CN) .......................... 2017 1 0598333

(51) Int. Cl.
*B23C 3/12* (2006.01)
*B23B 9/08* (2006.01)
(Continued)

(52) U.S. Cl.
CPC .................. *B23C 3/12* (2013.01); *B23B 3/10* (2013.01); *B23B 5/16* (2013.01); *B23B 9/08* (2013.01); *B23Q 7/02* (2013.01); *B24B 9/00* (2013.01); *B24B 41/068* (2013.01); *B23C 2215/085* (2013.01); *B23C 2220/16* (2013.01);
(Continued)

(58) Field of Classification Search
CPC . Y10T 29/5128; Y10T 29/5127; Y10T 82/18; Y10T 82/21; Y10T 82/2511; Y10T 82/2524; B23C 2215/08; B23C 2220/16; B23C 2220/20; B23B 9/00; B23B 9/02;
(Continued)

(56) References Cited

U.S. PATENT DOCUMENTS 1,258,089 A * 3/1918 Bullard ................ B23Q 39/042
29/38 A
1,696,027 A * 12/1928 Bullard ................ B23Q 39/042
29/38 A
(Continued)

FOREIGN PATENT DOCUMENTS

WO    WO-2015145345 A1 * 10/2015 ........... B23B 29/205

*Primary Examiner* — Erica E Cadugan
*Assistant Examiner* — Michael Vitale
(74) *Attorney, Agent, or Firm* — Calfee, Halter & Griswold LLP

(57) ABSTRACT

Disclosed is a wheel cap section chamfering device, comprising a main frame, a secondary frame, a lower servo motor, a key, a bearing seat, a left bearing seat, a left shaft, a left bearing, a left driven friction wheel, a left sleeve, left corner cylinder pressure claws, a left turntable, a left mandrel seat, a left mandrel, a chamfer mill, a tool apron, a feeding platform, a feeding cylinder, guide sleeves, guide posts, a support plate, guide rails, a compression cylinder, a translation sliding table, an upper servo motor, a driving friction wheel, a right mandrel, a right mandrel seat, a right turntable, right corner cylinder pressure claws, a right sleeve, a right driven friction wheel, a right bearing, a right shaft, a right bearing seat, a station rotating platform, a shaft and a bearing.

1 Claim, 3 Drawing Sheets

(51) Int. Cl.
*B24B 9/00* (2006.01)
*B23B 3/10* (2006.01)
*B23Q 7/02* (2006.01)
*B23B 5/16* (2006.01)
*B24B 41/06* (2012.01)
*B60B 7/00* (2006.01)
*B23Q 39/04* (2006.01)

(52) U.S. Cl.
CPC ...... *B23C 2220/20* (2013.01); *B23C 2260/08* (2013.01); *B23Q 39/046* (2013.01); *B60B 7/0013* (2013.01); *Y10T 29/5128* (2015.01); *Y10T 82/18* (2015.01); *Y10T 82/2511* (2015.01); *Y10T 82/2524* (2015.01); *Y10T 409/304256* (2015.01); *Y10T 409/306104* (2015.01)

(58) Field of Classification Search
CPC ........ B23B 9/08; B23Q 39/04; B23Q 39/042; B23Q 39/044
USPC .................. 29/38 A, 38 R; 82/122, 129, 104
See application file for complete search history.

(56) References Cited

U.S. PATENT DOCUMENTS

| | | | | |
|---|---|---|---|---|
| 1,864,307 A | * | 6/1932 | Johnson | B23Q 11/0875 29/38 A |
| 2,524,170 A | * | 10/1950 | Johnson | B23Q 1/28 82/158 |
| 2,540,186 A | * | 2/1951 | Bullard | B23Q 39/042 279/4.12 |
| 2001/0021338 A1 | * | 9/2001 | Mitsuzono | B23Q 1/012 409/201 |

\* cited by examiner

WHEEL CAP SECTION CHAMFERING DEVICE

CROSS-REFERENCE TO RELATED APPLICATIONS

This application claims priority to Chinese Patent Application No. 201710598333.2, filed on Jul. 21, 2017, which is hereby incorporated by reference in its entirety.

TECHNICAL FIELD

The present application relates to the technical field of burr cleaning, specifically to a device for automatically removing burrs from chamfers at a cap section of a wheel.

BACKGROUND ART

For a fully coated hub having the front side not machined, the front side of a cap section is cast, and the depth of the cap section is turned by machining, so a ring of burrs remains at the joint of casting and machining. When a wheel drawing is designed, chamfers of C0.5-C1.5 are often designed at the burr part of the cap section, and the chamfers are 30°-60°. In actual production, the chamfers at the burr part are mostly manually removed, so the removal effect is not ideal, the roundness is poor, and the chamfers are not consistent in size and angle; and when a cap is mounted, the appearance is not qualified.

SUMMARY OF THE INVENTION

The aim of the present application is to provide a device for automatically removing burrs from chamfers at a cap section after wheel machining.

In order to fulfill the above aim, the present application adopts the following technical solution: A wheel cap section chamfering device comprises a main frame, a secondary frame, a lower servo motor, a key, a bearing seat, a left bearing seat, a left shaft, a left bearing, a left driven friction wheel, a left sleeve, left corner cylinder pressure claws, a left turntable, a left mandrel seat, a left mandrel, a chamfer mill, a tool apron, a feeding platform, a feeding cylinder, guide sleeves, guide posts, a support plate, guide rails, a compression cylinder, a translation sliding table, an upper servo motor, a driving friction wheel, a right mandrel, a right mandrel seat, a right turntable, right corner cylinder pressure claws, a right sleeve, a right driven friction wheel, a right bearing, a right shaft, a right bearing seat, a station rotating platform, a shaft and a bearing.

The secondary frame is fixed at the bottom of the main frame, the lower servo motor is mounted on the secondary frame, and the output end of the lower servo motor is connected with the shaft via the key and controls rotation of the shaft under the action of the bearing and the bearing seat. The output end of the shaft is fixedly connected with the station rotating platform, and a station I system and a station II system are arranged on the station rotating platform.

The station I system: the left bearing seat is fixed on the left of the station rotating platform, the left shaft and the left bearing are mounted in the left bearing seat, and the left driven friction wheel is mounted on the left shaft and fixed via the left sleeve. The output end of the left shaft is fixedly connected with the left turntable, the end face of the left turntable achieves an axial positioning effect, the left mandrel seat is mounted in the center of the left turntable, the left mandrel is mounted on the left mandrel seat to achieve a radial positioning effect, and the three left corner cylinder pressure claws are distributed on the left turntable to clamp a wheel.

The station II system: the right bearing seat is fixed on the right of the station rotating platform, the right shaft and the right bearing are mounted in the right bearing seat, and the right driven friction wheel is mounted on the right shaft and fixed via the right sleeve. The output end of the right shaft is fixedly connected with the right turntable, the end face of the right turntable achieves an axial positioning effect, the right mandrel seat is mounted in the center of the right turntable, the right mandrel is mounted on the right mandrel seat to achieve a radial positioning effect, and the three right corner cylinder pressure claws are distributed on the right turntable to clamp the wheel.

The support plate and the compression cylinder are mounted at the upper part of the main frame, the two guide rails are mounted on the support plate, the translation sliding table is mounted on the guide rails, and the output end of the compression cylinder is connected with the translation sliding table and controls its horizontal motion. The upper servo motor is mounted below the translation sliding table, and the driving friction wheel is mounted on the shaft at the output end of the upper servo motor 25.

The feeding cylinder and the two guide sleeves are mounted on the main frame above the station I, the output end of the feeding cylinder is connected with the feeding platform, the two guide posts are mounted on the feeding platform, and the feeding cylinder controls the feeding platform to move up and down under the action of the guide posts and the guide sleeves. The tool apron is mounted below the feeding platform, the chamfer mill is mounted on the tool apron, angle scales are distributed on the tool apron, and when the angles of chamfers are changed, correspondingly adjusting the mounting angle of the chamfer mill is enough.

The working process of the device is as follows: firstly, a wheel is put into the station II system, and the right corner cylinder pressure claws clamp the wheel; the lower servo motor is started to drive the station rotating platform to rotate 180°, so that the wheel in the station II system is located directly below the chamfer mill; then the compression cylinder is started to drive the translation sliding table to move left, so that the driving friction wheel contacts the driven friction wheel and is pre-tightened; the upper servo motor is started, and the wheel rotates at a low speed under the action of drive of the friction wheels; the feeding cylinder is started to drive the chamfer mill to be fed, and the chamfer mill begins removing burrs from the chamfers when arriving at the burr part of the cap section; and finally, chamfering is completed after the wheel continuously rotates one circle. When the wheel in the station II system is in a machined state, the station I system is located outside, the operator puts a wheel to be machined onto the station I system; after the wheel in the station II system is machined, the compression cylinder and the feeding cylinder are reset, drive of the friction wheels is released, the lower servo motor is started to drive the station rotating platform to rotate 180°, the wheel on the station I enters a machining state, at the moment, the just machined wheel on the station II rotates to the outside, the operator takes the machined wheel down and puts a wheel to be machined, and so on.

The present application may meet the requirement for automatically removing burrs from chamfers at the cap section after wheel machining, reduce the labor intensity of workers, improve the production efficiency and improve the chamfer precision of the cap section; and the device has the characteristics of simple structure, stability, high efficiency, easy operation and the like.

Figure 1:
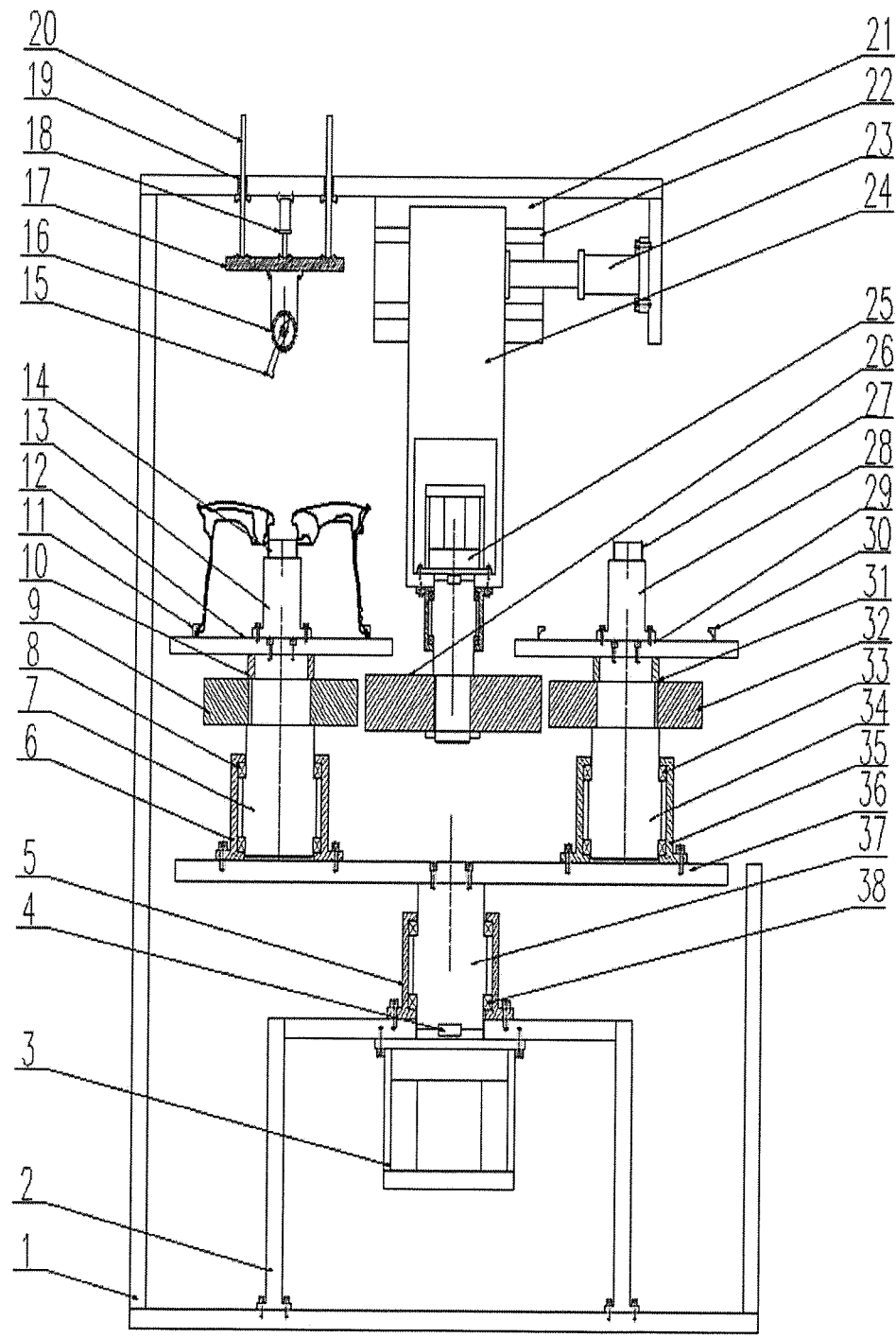
FIG. 1 is a front view of a wheel cap section chamfering device of the present application.
Figure 2:
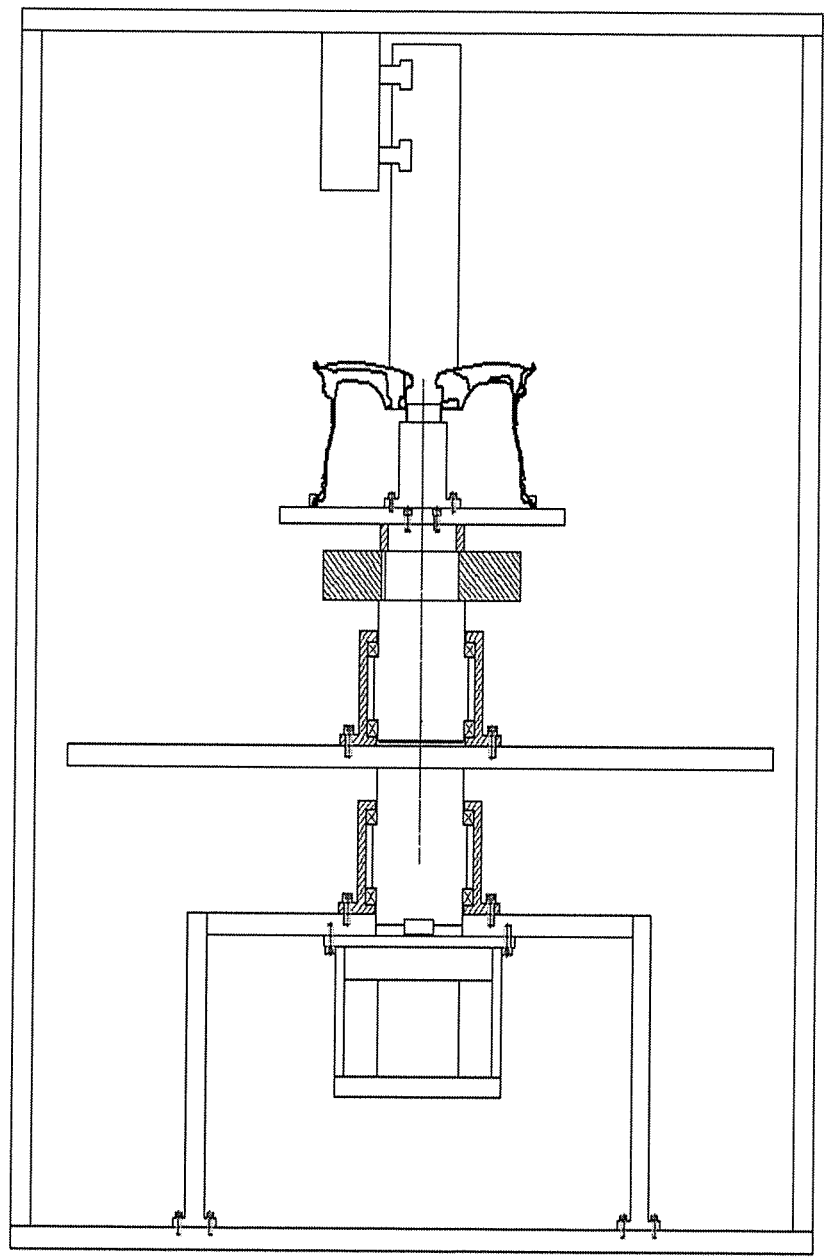
FIG. 2 is a left view of the wheel cap section chamfering device of the present application.
Figure 3:
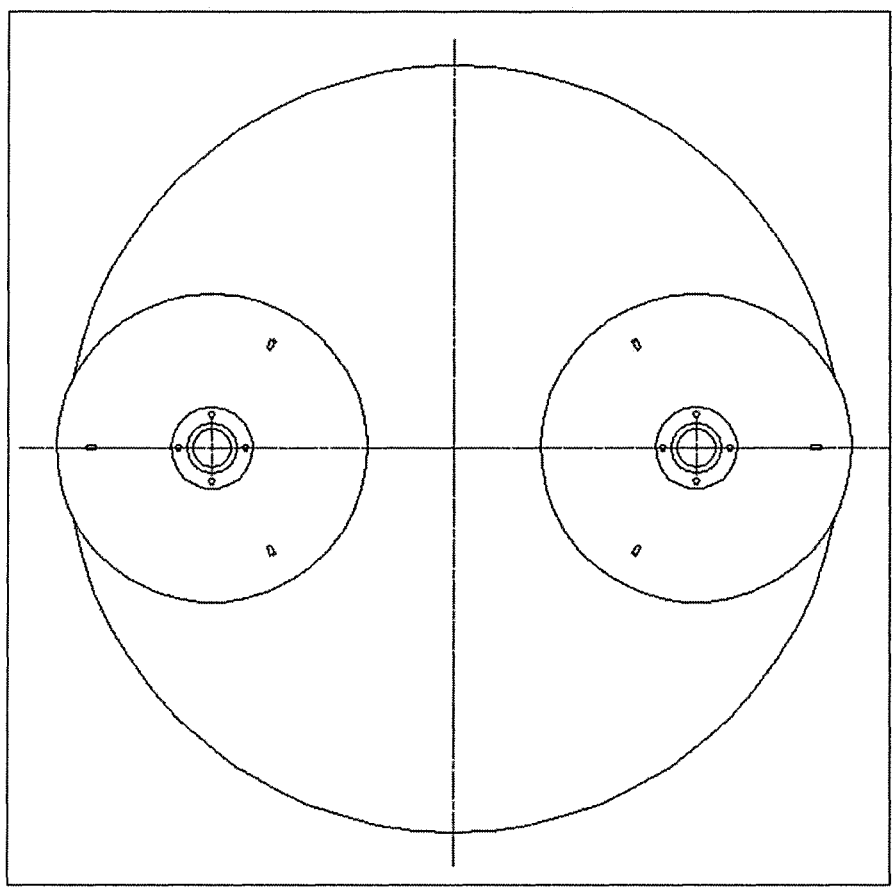
FIG. 3 is a top view of the wheel cap section chamfering device of the present application.

In figures: 1—main frame, 2—secondary frame, 3—lower servo motor, 4—key, 5—bearing seat, 6—left bearing seat, 7—left shaft, 8—left bearing, 9—left driven friction wheel, 10—left sleeve, 11—left corner cylinder pressure claw, 12—left turntable, 13—left mandrel seat, 14—left mandrel, 15—chamfer mill, 16—tool apron, 17—feeding platform, 18—feeding cylinder, 19—guide sleeve, 20—guide post, 21—support plate, 22—guide rail, 23—compression cylinder, 24—translation sliding table, 25—upper servo motor, 26—driving friction wheel, 27—right mandrel, 28—right mandrel seat, 29—right turntable, 30—right corner cylinder pressure claw, 31—right sleeve, 32—right driven friction wheel, 33—right bearing, 34—right shaft, 35—right bearing seat, 36—station rotating platform, 37—shaft, 38—bearing, 39—angle scales.

DETAILED DESCRIPTION OF THE INVENTION

Details and working conditions of a specific device provided by the present application will be given below in combination with the accompanying drawings.

A wheel cap section chamfering device comprises a main frame 1, a secondary frame 2, a lower servo motor 3, a key 4, a bearing seat 5, a left bearing seat 6, a left shaft 7, a left bearing 8, a left driven friction wheel 9, a left sleeve 10, left corner cylinder pressure claws 11, a left turntable 12, a left mandrel seat 13, a left mandrel 14, a chamfer mill 15, a tool apron 16, a feeding platform 17, a feeding cylinder 18, guide sleeves 19, guide posts 20, a support plate 21, guide rails 22, a compression cylinder 23, a translation sliding table 24, an upper servo motor 25, a driving friction wheel 26, a right mandrel 27, a right mandrel seat 28, a right turntable 29, right corner cylinder pressure claws 30, a right sleeve 31, a right driven friction wheel 32, a right bearing 33, a right shaft 34, a right bearing seat 35, a station rotating platform 36, a shaft 37 and a bearing 38.

The secondary frame 2 is fixed at the bottom of the main frame 1, the lower servo motor 3 is mounted on the secondary frame 2, and the output end of the lower servo motor 3 is connected with the shaft 37 via the key 4 and controls rotation of the shaft 37 under the action of the bearing 38 and the bearing seat 5. The output end of the shaft 37 is fixedly connected with the station rotating platform 36, and a station I system and a station II system are arranged on the station rotating platform 36.

The station I system: the left bearing seat 6 is fixed on the left of the station rotating platform 36, the left shaft 7 and the left bearing 8 are mounted in the left bearing seat 6, and the left driven friction wheel 9 is mounted on the left shaft 7 and fixed via the left sleeve 10. The output end of the left shaft 7 is fixedly connected with the left turntable 12, the end face of the left turntable 12 achieves an axial positioning effect, the left mandrel seat 13 is mounted in the center of the left turntable 12, the left mandrel 14 is mounted on the left mandrel seat 13 to achieve a radial positioning effect, and the three left corner cylinder pressure claws 11 are distributed on the left turntable 12 to clamp a wheel.

The station II system: the right bearing seat 35 is fixed on the right of the station rotating platform 36, the right shaft 34 and the right bearing 33 are mounted in the right bearing seat 35, and the right driven friction wheel 32 is mounted on the right shaft 34 and fixed via the right sleeve 31. The output end of the right shaft 34 is fixedly connected with the right turntable 29, the end face of the right turntable 29 achieves an axial positioning effect, the right mandrel seat 28 is mounted in the center of the right turntable 29, the right mandrel 27 is mounted on the right mandrel seat 28 to achieve a radial positioning effect, and the three right corner cylinder pressure claws 30 are distributed on the right turntable 29 to clamp the wheel.

The support plate 21 and the compression cylinder 23 are mounted at the upper part of the main frame 1, the two guide rails 22 are mounted on the support plate 21, the translation sliding table 24 is mounted on the guide rails 22, and the output end of the compression cylinder 23 is connected with the translation sliding table 24 and controls its horizontal motion. The upper servo motor 25 is mounted below the translation sliding table 24, and the driving friction wheel 26 is mounted on the shaft at the output end of the upper servo motor 25.

The feeding cylinder 18 and the two guide sleeves 19 are mounted on the main frame 1 above the station I, the output end of the feeding cylinder 18 is connected with the feeding platform 17, the two guide posts 20 are mounted on the feeding platform 17, and the feeding cylinder 18 controls the feeding platform 17 to move up and down under the action of the guide posts 20 and the guide sleeves 19. The tool apron 16 is mounted below the feeding platform 17, the chamfer mill 15 is mounted on the tool apron 16, angle scales 39 are distributed on the tool apron 16, and when the angles of chamfers are changed, correspondingly adjusting the mounting angle of the chamfer mill 15 is enough.

The working process of the device is as follows: firstly, a wheel is put into the station II system, and the right corner cylinder pressure claws 30 clamp the wheel; the lower servo motor 3 is started to drive the station rotating platform 36 to rotate 180°, so that the wheel in the station II system is located directly below the chamfer mill 15; then the compression cylinder 23 is started to drive the translation sliding table 24 to move left, so that the driving friction wheel 26 contacts the driven friction wheel and is pre-tightened; the upper servo motor 25 is started, and the wheel rotates at a low speed under the action of drive of the friction wheels; the feeding cylinder 18 is started to drive the chamfer mill 15 to be fed, and the chamfer mill 15 begins removing burrs from the chamfers when arriving at the burr part of the cap section; and finally, chamfering is completed after the wheel continuously rotates one circle. When the wheel in the station II system is in a machined state, the station I system is located outside, the operator puts a wheel to be machined onto the station I system; after the wheel in the station II system is machined, the compression cylinder 23 and the feeding cylinder 18 are reset, drive of the friction wheels is released, the lower servo motor 3 is started to drive the station rotating platform 36 to rotate 180°, the wheel on the station I enters a machining state, at the moment, the just machined wheel on the station II rotates to the outside, the operator takes the machined wheel down and puts a wheel to be machined, and so on.

The present application may meet the requirement for automatically removing burrs from chamfers at the cap section after wheel machining, reduce the labor intensity of workers, improve the production efficiency and improve the chamfer precision of the cap section; and the device has the characteristics of simple structure, stability, high efficiency, easy operation and the like.

The foregoing descriptions of specific exemplary embodiments of the present application have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present application, as well as various alternatives and modifications thereof. It is intended that the scope of the invention be defined by the Claims appended hereto and their equivalents.

What is claimed is:

1. A wheel cap section chamfering device, comprising:
a main frame having a top and a bottom, a secondary frame, a lower servo motor, a key, a bearing seat, a left bearing seat, a left shaft, a left bearing, a first driven friction wheel, a left sleeve, left corner cylinder pressure claws, a left turntable, a left mandrel seat, a left mandrel, a chamfer mill, a tool apron, a feeding platform, a feeding cylinder, guide sleeves, guide posts, a support plate, two guide rails, a compression cylinder, a translation sliding table, an upper servo motor, a driving friction wheel, a right mandrel, a right mandrel seat, a right turntable, right corner cylinder pressure claws, a right sleeve, a second driven friction wheel, a right bearing, a right shaft, a right bearing seat, a station rotating platform, a shaft and a bearing, wherein an output end of the shaft is fixedly connected with the station rotating platform, and a station I system and a station II system are arranged on the station rotating platform;

the left bearing seat is fixed on the left of the station rotating platform, the left shaft and the left bearing are mounted in the left bearing seat, and the first driven friction wheel is mounted on the left shaft and fixed via the left sleeve; the left bearing seat, the left shaft, the left bearing, the first driven friction wheel, and the left sleeve constitute the station I system;

the right bearing seat is fixed on the right of the station rotating platform, the right shaft and the right bearing are mounted in the right bearing seat, and the second driven friction wheel is mounted on the right shaft and fixed via the right sleeve; and the right sleeve, the second friction wheel, the right bearing, the right shaft, the right bearing seat, and the station rotating platform constitute the station II system;

the support plate and the compression cylinder are mounted at the top of the main frame, the two guide rails are mounted on the support plate, the translation sliding table is mounted on the two guide rails, an output end of the compression cylinder is connected with the translation sliding table, the upper servo motor is mounted below the translation sliding table, and the driving friction wheel is mounted on the shaft at an output end of the upper servo motor;

the feeding cylinder and the two guide sleeves are mounted on the main frame above the station I system, an output end of the feeding cylinder is connected with the feeding platform, the two guide posts are mounted on the feeding platform, and the feeding cylinder controls the feeding platform to move up and down under the action of the guide posts and the guide sleeves;

the tool apron is mounted below the feeding platform, the chamfer mill is mounted on the tool apron, and angle scales are distributed on the tool apron, wherein the angles scales provide for adjusting a mounting angle of the chamfer mill; and a working process of the wheel cap section chamfering device is as follows:

first, a wheel is put into the station II system, and the right corner cylinder pressure claws clamp the wheel; next the lower servo motor is started to drive the station rotating platform to rotate 180° so that the wheel in the station II system is located directly below the chamfer mill; then the compression cylinder is started to drive the translation sliding table to move left so that the driving friction wheel contacts the second driven friction wheel; then the upper servo motor is started, and the wheel rotates at a low speed under the action of drive of the driving friction wheel; next the feeding cylinder is started to drive the chamfer mill to be fed, and the chamfer mill begins removing burrs from chamfers of a cap section of the wheel; and finally, chamfering is completed after the wheel continuously rotates one circle, wherein when the wheel in the station II system is in a machined state, an operator puts a second wheel to be machined into the station I system; after the wheel in the station II system is machined, the compression cylinder and the feeding cylinder are reset, drive of the driving friction wheel is released, and the lower servo motor is started so as to drive the station rotating platform to rotate 180° such that the station I system and the second wheel are located directly below the chamfer mill and the station II system is disposed so as that the wheel can be removed therefrom by the operator.

* * * * *